US012275267B2

(12) United States Patent
Kohlmann et al.

(10) Patent No.: US 12,275,267 B2
(45) Date of Patent: Apr. 15, 2025

(54) SECURITY PIGMENT AND OPTICAL SECURITY ELEMENT

(71) Applicant: VIAVI SOLUTIONS INC., San Jose, CA (US)

(72) Inventors: Paul Thomas Kohlmann, Windsor, CA (US); Vladimir P. Raksha, Santa Rosa, CA (US); Cornelis Jan Delst, Fairfax, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/066,182

(22) Filed: Oct. 8, 2020

(65) Prior Publication Data

US 2021/0101402 A1 Apr. 8, 2021

Related U.S. Application Data

(60) Provisional application No. 62/912,518, filed on Oct. 8, 2019.

(51) Int. Cl.
*B42D 25/369* (2014.01)
*B42D 25/373* (2014.01)

(52) U.S. Cl.
CPC ......... *B42D 25/369* (2014.10); *B42D 25/373* (2014.10)

(58) Field of Classification Search
None
See application file for complete search history.

(56) References Cited

U.S. PATENT DOCUMENTS

| | | | |
|---|---|---|---|
| 3,926,659 | A | 12/1975 | Bernhard et al. |
| 5,214,530 | A | 5/1993 | Coombs et al. |
| 6,759,097 | B2 | 7/2004 | Phillips et al. |
| 6,808,806 | B2 | 10/2004 | Phillips et al. |
| 6,902,807 | B1 | 6/2005 | Argoitia et al. |
| 7,047,883 | B2 | 5/2006 | Raksha et al. |
| 7,238,424 | B2 | 7/2007 | Raksha et al. |
| 7,604,855 | B2 | 10/2009 | Raksha et al. |
| 8,025,952 | B2 | 9/2011 | Raksha et al. |
| 10,174,203 | B2 | 1/2019 | Shimizu et al. |
| 2007/0098989 | A1 | 5/2007 | Raksha et al. |
| 2008/0019003 | A1 | 1/2008 | Phillips et al. |
| 2012/0205905 | A1 | 8/2012 | Degott et al. |

(Continued)

FOREIGN PATENT DOCUMENTS

| | | | |
|---|---|---|---|
| CN | 102781675 | A | 11/2012 |
| CN | 106660385 | A | 5/2017 |
| DE | 4313541 | A1 | 10/1994 |

(Continued)

OTHER PUBLICATIONS

Refractive Index.info, "Refractive index database", downloaded from the Internet on May 29, 2024, 3 pages.

(Continued)

*Primary Examiner* — Laura C Powers
(74) *Attorney, Agent, or Firm* — Mannava & Kang, P.C.

(57) ABSTRACT

An article including a substrate; and a composition on the substrate, the composition including a liquid medium, and a semi-transparent magnetic pigment including a semi-transparent, metallic, magnetic material and a dielectric material used as a light interference cavity is disclosed, A method of making the article is also disclosed.

19 Claims, 10 Drawing Sheets

(56) References Cited

U.S. PATENT DOCUMENTS

| | | | | |
|---|---|---|---|---|
| 2014/0362443 | A1* | 12/2014 | Markantes ............. | G02B 5/285<br>359/584 |
| 2015/0352887 | A1* | 12/2015 | Holmes .................. | B42D 25/00<br>427/7 |

FOREIGN PATENT DOCUMENTS

| | | | |
|---|---|---|---|
| DE | 10065761 | A1 | 7/2002 |
| EP | 341002 | B1 | 6/1995 |
| WO | 2009126437 | A1 | 10/2009 |
| WO | 2015086257 | A1 | 6/2015 |

OTHER PUBLICATIONS

Wikipedia, “Optical variable device”, downloaded from the Internet on May 29, 2024, 1 page.(https://en.wikipedia.org/wiki/Optical_variable_device).

China Patent Office, “English translation of The Notification of Reexamination for Chinese Application No. 2020800777288”, dated Jan. 15, 2025, 12 pages.

Xinlian Zhu et al., “Plastic Printing Technology and Application”, p. 259, Printing Industry Press, Jan. 2014, 1st Edition, 1st Printing (including Machine English translation).

Zuizhong Liu et al., “Anti-Counterfeit Printing and Packaging”, pp. 187-188, Cultural Development Press, Feb. 2018, 1st edition, 5th Printing (Including Machine English translation).

* cited by examiner

SECURITY PIGMENT AND OPTICAL SECURITY ELEMENT

RELATED APPLICATION

This application claims the benefit of priority of U.S. Provisional Patent Application No. 62/912,518, filed Oct. 8, 2019, the total disclosure of which is hereby incorporated by reference.

FIELD OF THE INVENTION

The present disclosure generally relates an article including a substrate; and a composition on the substrate, the composition including a liquid medium, and a semi-transparent magnetic pigment including a semi-transparent, metallic, magnetic material and a dielectric material used as a light interference cavity. The semi-transparent magnetic pigment is disclosed. A method of making the article and the semi-transparent magnetic pigment is disclosed.

BACKGROUND OF THE INVENTION

Iron-oxide containing pigments, such as all-dielectric pigments, exhibit different colors in reflection at a normal observation angle, but are limited in color from yellow-red to brown in transmission. For many applications, it doesn't matter, but for a security device printed on the top of a transparent window in a banknote, the absence of a full range of colors limits the product value.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
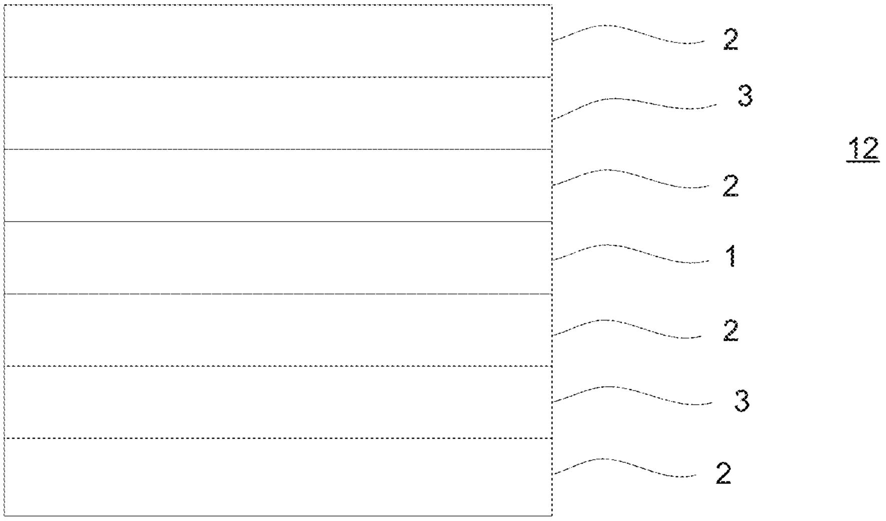
FIG. 1 is a cross-section of a semi-transparent magnetic pigment particle according to an aspect of the invention.

In an aspect, there is disclosed an article including a substrate; and a composition on the substrate, the composition including a liquid medium, and a semi-transparent magnetic pigment including a semi-transparent, metallic, magnetic material and a dielectric material used as a light interference cavity.

In another aspect, there is disclosed a method of making an article, including providing a substrate; and depositing a first composition on a first surface of a substrate, wherein the first composition includes a liquid medium and a semi-transparent magnetic pigment.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are pigments, compositions including the pigments, articles including the compositions; and methods of making and using the pigments, compositions, and articles.

The present disclosure describes a semi-transparent magnetic pigment 12. The semi-transparent magnetic pigment 12 can exhibit a variety of reflected colors and a variety of transmitted colors. The semi-transparent magnetic pigment 12 can be a magnetic dichroic pigment. At a normal angle, the semi-transparent magnetic pigment 12 can reflect a first color and transmit a second color, which is different from a first color. When the angle changes from normal, such as a change in a viewing angle, then the semi-transparent magnetic pigment 12 can reflect a third color and transmit a fourth color. For ease of reference herein, the terms "first color", "second color", "third color", and "fourth color" are used to differentiate between different colors and should not be used to limit to a specific color.

The semi-transparent magnetic pigment can include a semi-transparent, metallic, magnetic material 1, and a dielectric material 2, 3 used as a light interference cavity. In an aspect, the semi-transparent magnetic pigment 12 can have a structure as follows: dielectric (2, 3)/semi-transparent, metallic, magnetic material (1)/dielectric (2, 3), in which the dielectric can include one or more layers of a dielectric material 2, 3. For example, the semi-transparent magnetic pigment 12 can include multiple layers of dielectric material 2, 3 on opposing sides of a central semi-transparent, metallic, magnetic material 1. The multiple layers of dielectric material 2, 3 can include alternating layers of two different dielectric materials, such as a first dielectric material 2 and a second dielectric material 3. The multiple layers of dielectric material 2, 3 can act as a light interference cavity that results in color shift at angle.

In an aspect, the semi-transparent magnetic pigment 12 can include a semi-transparent, metallic, magnetic material 1, a dielectric material 2, 3, and can also include a metal material 4. The semi-transparent magnetic pigment 12 can have a structure as follows: (metal material/dielectric material)$_n$/semi-transparent, metallic, magnetic material/(dielectric material/metal material)$_n$, wherein n is an integer greater than or equal to 1.

The semi-transparent magnetic pigment 12 can include one or more layers of the semi-transparent, metallic, magnetic material 1, one or more layer of the dielectric material 2, 3, and optionally one or more layers of a metal material 4. The semi-transparent magnetic pigment 12 can include an even number of layers, such as two layers, four layers, six layers, etc. The semi-transparent magnetic pigment 12 can include an odd number of layers, such as three layers, five layers, seven layers, etc.

The dielectric material 2, 3 for use in the disclosed semi-transparent magnetic pigment 12 can be any low refractive index material 3, any high refractive index material 2, and combinations thereof. For example, multiple layers of $MgF_2$, $SiO_2$, $Ta_2O_5$, $TiO_2$, ZnS and other materials with low and high refractive index can form. The dielectric material 2, 3 can be present in a layer or as a particle in a layer. In an aspect, the dielectric material 2, 3 present in one or more layers of the semi-transparent magnetic pigment 12 can be the same or different.

The dielectric material can be a high refractive index material 2, i.e., having a refractive index greater than greater than about 1.65. The high refractive index material 2 can include oxides, sulfides, carbides, niobates, and nitrides. Non-limiting examples of high refractive index material 2 include, zinc sulfide (ZnS), zinc oxide (ZnO), zirconium oxide ($ZrO_2$), titanium dioxide ($TiO_2$), magnesium aluminate ($MgAl_2O_4$), titanium nitride (TiN), diamond-like carbon, indium oxide ($In_2O_3$), indium-tin-oxide (ITO), tantalum pentoxide ($Ta_2O_5$), cerium oxide (CeO2), yttrium oxide ($Y_2O_3$), europium oxide ($Eu_2O_3$), iron oxides such as (II) diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), or their combinations.

The dielectric material can be a low refractive index material 3, i.e., having a refractive index less than about 1.65. The low refractive index material 3 can include fluorides, oxides, and chalcogenides. Non-limiting examples of low refractive index material 3 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), or their combinations. Organic monomers and polymers can be utilized as low refractive index materials 3, including dienes or alkenes such as acrylates methacrylate), perfluoroalkenes, polytetrafluoroethylene (Teflon), fluorinated ethylene propylene (FEP), or their combinations thereof.

The dielectric material 2, 3 can be deposited as a dielectric stack having a predetermined number of layers. In this example, the stack can include one or more layers of a low refractive index material 3 and one or more layers of a high refractive index material 2. The layers having low refractive index material (low refractive index layers) 3 and the layers having high refractive index material (high refractive index layers) 2 can alternate. Alternating layers of high and low refractive index layers can be repeated as many times as necessary. The alternating layers can be stacked in any sequence, for example, the layers can be stacked in a sequence of $(H/L)_n$, $(H/L)_nH$, or $L(H/L)_n$ wherein H denotes higher refractive index layer 2 and L denotes a lower refractive index layer 3, and n is an integer greater than or equal to 1. Any number of layers can be deposited using any number of different materials with differing optical and/or physical thickness, in reality the number of layers is limited by a limit of total thickness that can be manufactured as pigment, in the range of up to 10 micrometer. In this manner, the tailoring of the optical design is possible by controlling the layer thickness and refractive index of each dielectric layer. In an aspect, the dielectric layer can be a transparent layer or can be a colored layer.

The semi-transparent magnetic material 1 for use in the disclosed semi-transparent magnetic pigment 12 can provide a function chosen from an optical function, a magnetic function, and combinations thereof. In an optical function, the semi-transparent, metallic, magnetic material 1 can function as semi-transparent reflectors and absorbers in a Fabry-Perot structure. In a magnetic function, the semi-transparent, metallic, magnetic material 1 can be carefully selected to provide alignment of the semi-transparent magnetic pigment 12 when dispersed in a layer of a composition. A magnetic field 16 can be applied to the composition 14 before the material is cured to a solid for formation of a predetermined optical effect.

The semi-transparent, metallic, magnetic material 1 can be present in the semi-transparent magnetic pigment 12 as a thin layer or as a particle in a layer, including as multiple layers within the semi-transparent magnetic pigment 12. In an aspect, the semi-transparent, metallic, magnetic material 1 present in the semi-transparent magnetic pigment 12 can be a single material or multiple different materials. The semi-transparent, metallic, magnetic material 1 can be located at a center of the semi-transparent magnetic pigment 12.

The semi-transparent, metallic, magnetic material 1 can include magnetic permeable, magnetic orientable materials, and combinations thereof. The semi-transparent, metallic, magnetic material 1 can be a material chosen from ferromagnetic and ferrimagnetic materials, for example, with soft or hard magnetic properties. The semi-transparent, metallic, magnetic material 1 can be a ferromagnetic material positioned in a center layer of the semi-transparent magnetic pigment 12.

Non-limiting examples of semi-transparent, metallic, magnetic materials 1 include iron, nickel, cobalt, their alloys with other ferromagnetic and non-ferromagnetic metals, and metalloids. Additional examples of the semi-transparent, metallic, magnetic material 1, include but are not limited to, gadolinium, terbium, dysprosium, erbium, and their blends, alloys or oxides. Non-limiting examples of blends or alloys include Fe/Si, Fe/Ni, Fe/Co, Fe/Cr/AI, Fe/terbium, Fe/Ni/Mo, Fe/Cr, Ni/Cr, Ni/Co, Co/Pt, Co/Cr, and combinations thereof. In an aspect, the semi-transparent, metallic, magnetic material 1 can be a composition 14 including a polymer containing iron oxide particles. Hard magnets of the type $SmCo_5$, $NdCo_5$, $Sm_2Co_{17}$, $Nd_2Fe_{14}B$, $Sr_6Fe_2O_3$, $TbFe_2$, NiAl, $NiAl_3$, $Ni_3Al$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. In an aspect, the semi-transparent, metallic, magnetic material 1 can be ferritic stainless steel.

The semi-transparent, metallic, magnetic material 1 can be selected for its reflecting or absorbing properties as well as its magnetic properties. The semi-transparent, metallic, magnetic material 1 can be formed by a material having magnetic and non-magnetic particles, or magnetic particles (or flakes) within a non-magnetic medium. The semi-transparent, metallic, magnetic material 1 can either be a distinct layer or can either function as a reflector layer (magnetic reflector layer) or an absorber layer.

Although this broad range of semi-transparent, metallic, magnetic materials 1 can be used, "soft" magnets can be used in an aspect. The semi-transparent, metallic, magnetic material 1 can be easily magnetized and demagnetized with soft magnetic properties. As used herein, the term "soft magnets" refers to any material exhibiting ferromagnetic properties but having a remanence that is substantially zero after exposure to a magnetic force. Soft magnets can show a quick response to an applied magnetic field 16, but have very low (coercive fields (Hc)=0.05-300 Oersted (Oe)) or zero magnetic signatures, or retain very low magnetic lines of force after the magnetic field 16 is removed. Similarly, as used herein, the term "hard magnets" (also called permanent magnets) refers to any material that exhibits ferromagnetic properties and that has a long lasting remanence after exposure to a magnetizing force, A ferromagnetic material is any material that has permeability substantially greater than 1 and that exhibits magnetic hysteresis properties. In an aspect, any semi-transparent, metallic, magnetic material 1 can be used so long as the material enables the orienting of the semi-transparent magnetic pigment 12 in a magnetic field 16.

The semi-transparent magnetic pigment 12 can also include a metal material 4, The metal material 4 can be a semi-transparent absorber. The metal material 4 can be the same or different from the semi-transparent, metallic, magnetic material 1 discussed herein. The metal material 4 can include metals and/or metal alloys. In an aspect, the metal material 4 can include materials that have reflective characteristics, An example of a reflective material can be aluminum, which has good reflectance characteristics, is inexpensive, and easy to form into or deposit as a thin layer. However, other reflective materials can also be used in place of aluminum. Non-limiting examples of a metal material 4 can include aluminum, copper, silver, gold, platinum, palladium, nickel, cobalt, niobium, chromium, tin, combinations thereof, and alloys of these or other metals. In an aspect, the metal material 4 can be a white or light colored metal. Other useful metal materials 4 include, but are not limited to, the transition and lanthanide metals and combinations thereof.

A method of making a semi-transparent magnetic pigment 12 can include depositing a first dielectric material 3 on a substrate, optionally including a release layer; depositing a semi-transparent, metallic, magnetic material 1 on the first dielectric material 3; and depositing a second dielectric material 3 on the semi-transparent magnetic material 1. The method can further include depositing additional dielectric materials 2 on the first and/or second dielectric material 3, for example, to form a dielectric stack of alternating layers of a high refractive index dielectric material 2 and a low refractive index dielectric material 3. The method can further include depositing the first dielectric material 3 on a first metal material 4; and/or depositing a second metal material 4 on the second dielectric material 3. After deposition is completed the material can be removed from the substrate and sized to a suitable size for optically variable pigment. The thickness of the pigment is determined by the cumulative layer thickness, the sizing determines the other dimensions, and these can be in the range of 5 to 50 micrometer D50.

The semi-transparent magnetic pigment 12 can be dispersed in a liquid medium to form a composition 14. The composition 14 can be an ink, coating or a paint. The liquid medium can be a transparent, colorless organic binder. Non-limiting examples of a liquid medium can include solvents, for example acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. The liquid medium can also be a radiation cured ink or paint with a high solids content and low solvents content, or a hybrid system that is radiation cured and does contain solvents. In an aspect, the liquid medium can be present in an amount ranging from about 0% to about 99.9%, for example, from about 0.005% to about 99%, and as a further example from about 0.05% to about 90%, by weight relative to the total weight of the composition. In an aspect, the composition 14 can include any pigment including a semi-transparent, metallic, magnetic material 1 and capable of being aligned in a magnetic field 16.

The composition 14 can be placed in a magnetic field 16 to align the semi-transparent magnetic pigment 12 in the liquid medium. Once the semi-transparent magnetic pigment 12 is aligned, the composition 14 can be cured to fix the aligned semi-transparent magnetic pigment 12.

The composition 14 can be printed on a substrate 18 to form an article 22. In an aspect, the article 22 can be a banknote with a transparent window 38. The article 22 can include the substrate 18 with a coating of the composition 14, which includes a liquid medium and the disclosed semi-transparent Magnetic Pigment 12.

EXAMPLES

Figure 4:
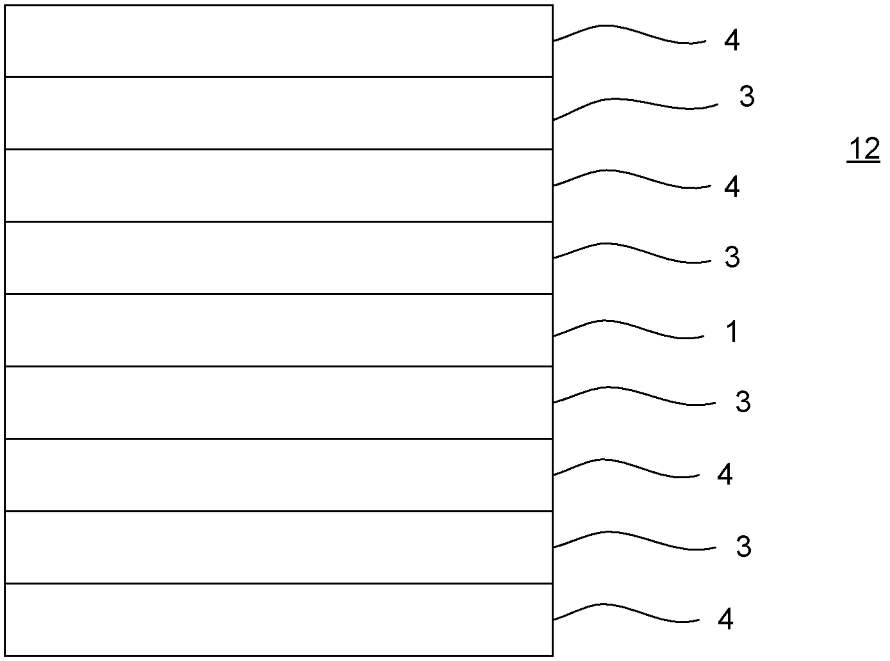
FIG. 4 is a cross-section of a semi-transparent magnetic pigment particle according to another aspect of the invention.

Example 1—The semi-transparent magnetic pigment 12 was formed having the following structure (9-layer): as shown in FIG. 4: (4) Al—4 nm/(3) $MgF_2$—163 nm/(4) Al—3 nm/(3) $MgF_2$—163 nm/(1) Co–nm/(3) $MgF_2$—163 nm (4) Al—3 nm (3)$MgF_2$—163 nm/(4) Al—4 nm.

Figure 5:
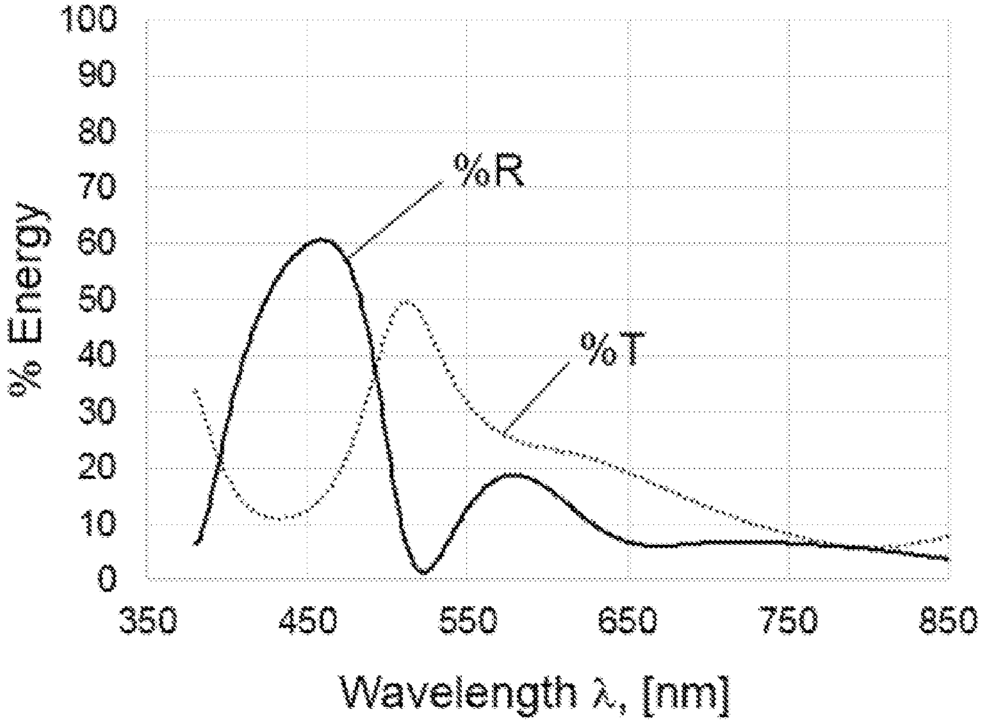
FIG. 5 is a spectral plot of the reflection and transmission of the semi-transparent magnetic pigment particle of FIG. 4.
Figure 6:
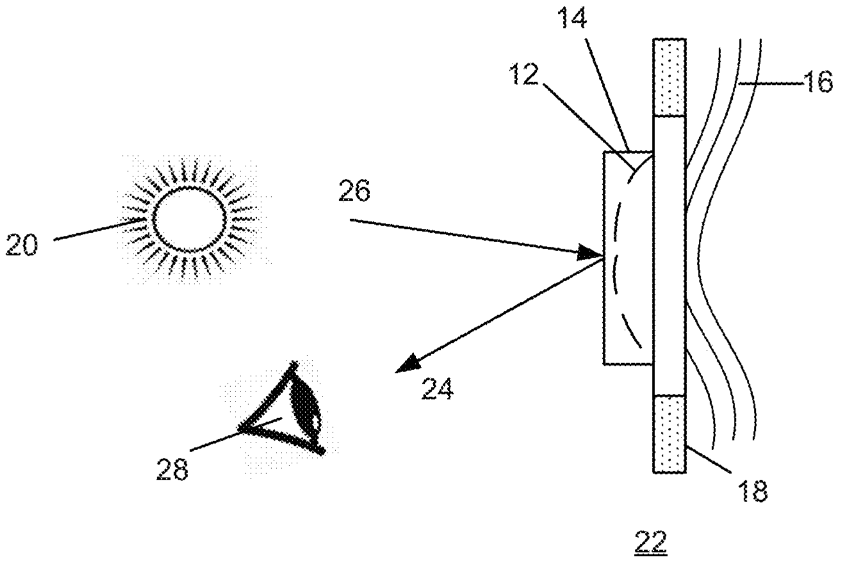
FIG. 6 is a schematic illustrating reflected light from an article after pigment was aligned in a magnetic field.

The colors of the semi-transparent magnetic pigment 12 at a normal observation angle are blue (first color) in reflection and yellow (second color) in transmission. An article 22 printed with a composition 14 including the semi-transparent magnetic pigment 12 changed its reflected color from blue to purple. In transmission, the color of the article 22 changed from yellow to green. FIG. 5 illustrates the spectral plot of a composition 14 including the semi-transparent magnetic pigment 12, wherein the composition 14 was printed on a top of a substrate 18, in an article 22 as shown in FIG. 6.

An insignia printed with the semi-transparent magnetic pigment 12 on a top of a transparent window 38 of a banknote, can be blue (first color) in reflection and yellow (second color) in transmission.

Example 2—As shown in FIG. 1, a semi-transparent magnetic, pigment 12 was formed having the following structure: (2) ZnS—100 nm (3) $MgF_2$ —310 nm/(2) ZnS—138 nm/(1) Ni—14 nm/(2) ZnS—138 nm (3) $MgF_2$—310 nm/(2) ZnS 100 nm.

Figure 2:
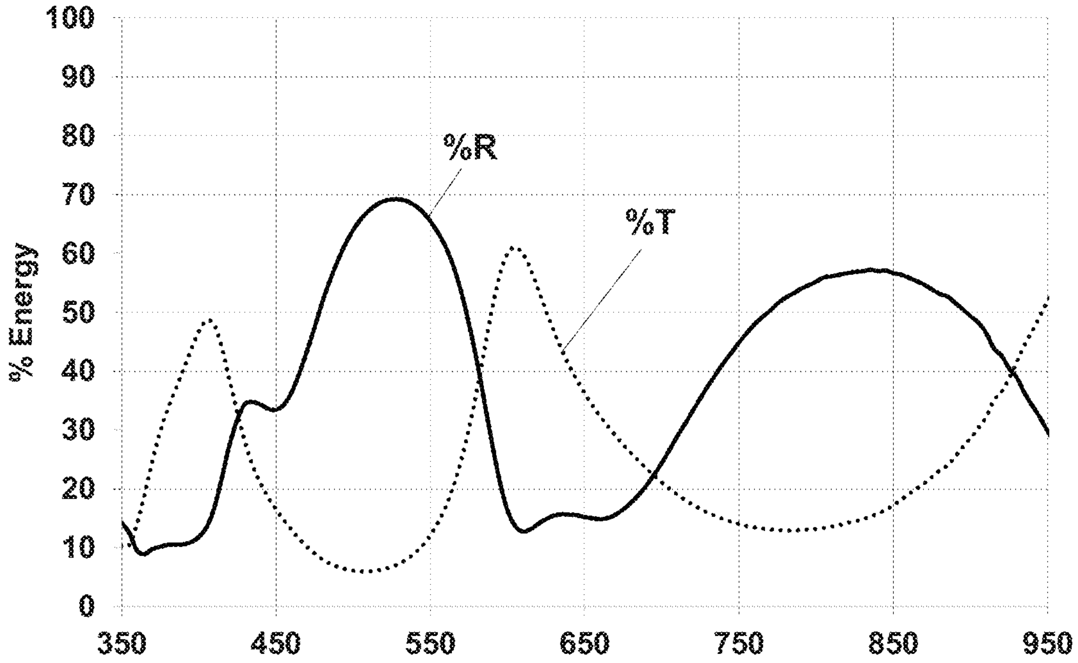
FIG. 2 is a spectral plot of the reflection and transmission of the semi-transparent magnetic pigment particle of FIG. 1.

As shown in FIG. 2, the colors of the semi-transparent magnetic pigment 12 at normal observation angles are green (first color) in reflection and a purple (second color) at tilt. In transmission, the semi-transparent magnetic pigment 12 at normal observation angle is purple (third color) and green (fourth color) at tilt.

Example 3—As shown in FIG. 1, a semi-transparent magnetic pigment 12 was formed having the following structure: (2) ZnS—130 nm/(3) $MgF_2$ —316 nm/(2) ZnS—160 nm (1) Co—6 nm/(2) ZnS—160 nm/(3) $MgF_2$—316 nm/(2) ZnS—130 nm.

Figure 3:
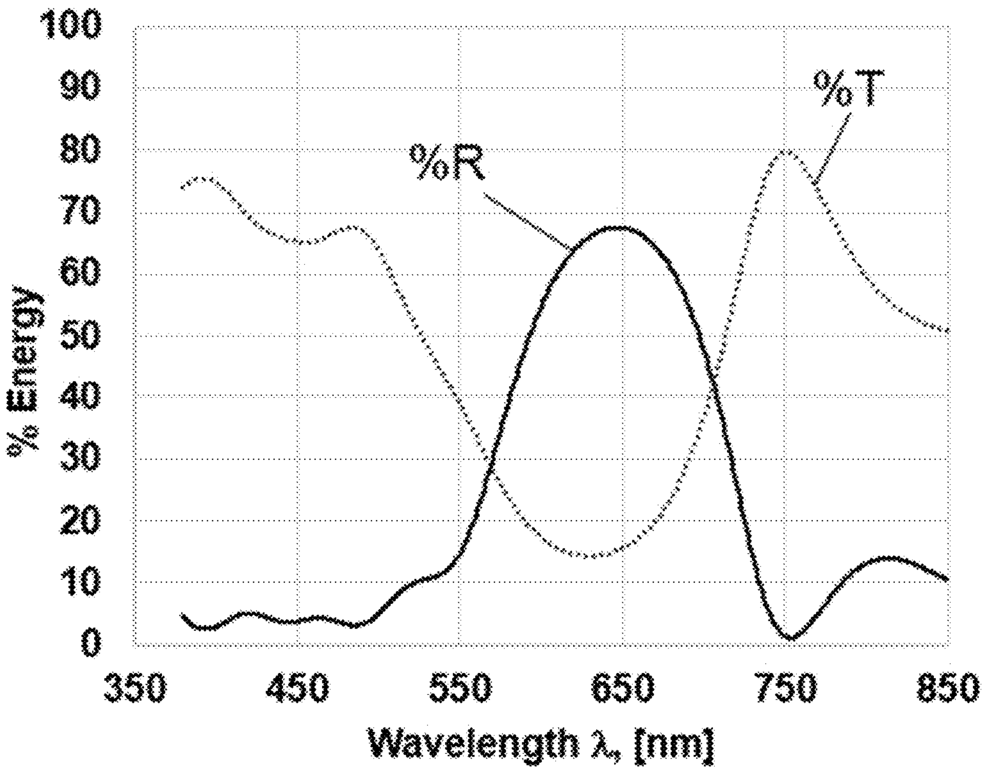
FIG. 3 is a spectral plot of the reflection and transmission of the semi-transparent magnetic pigment particle of FIG. 1.

As shown in FIG. 3, the colors of the semi-transparent magnetic pigment 12 at normal observation angles are orange (first color) in reflection and blue (second color) in transmission. In reflection, the orange color gradually changes to green (third color) at a change of angle from normal. In transmission, the color changes from blue to purple (fourth color) with a change of angle from normal.

A layer of cobalt (or another semi-transparent, metallic, magnetic material 1) can respond to an applied magnetic field 16 and can align the semi-transparent magnetic pigment 12 along lines of the magnetic field 16. The alignment of the semi-transparent magnetic pigment 12, in a composition 14 also including a liquid medium, can result in an optical convex or concave reflector similar to a Fresnel mirror. Incident light reflected from the semi-transparent magnetic pigment 12 can generate movement of a focal point of the reflected light in response to tilting of an article 22 printed with the composition 14. The movement of the focal point of reflected light can create an observer's perception of three-dimensionality. There can also be a gradual change of a first color of reflected light to a second color of reflected light. When the article 22 printed with the composition 14 is viewed in transmission, then the transmitted color is an unappealing grey and the three-dimensional optical effects are not visible.

As shown in FIG. 6, a light ray 26 from a light source 20 can shine onto the semi-transparent magnetic pigment 12 and can reflect in direction 24 toward an observer 28. The semi-transparent magnetic pigment 12, oriented with their planes along curved lines of the magnetic field 16, can produce a convex mirror, which is perceived by the observer 28 as a bright band of reflected light, moving within the article 22 at a tilt or rotation of the substrate 18. This effect is known as the "rolling bar optical effect."

Figure 7A:
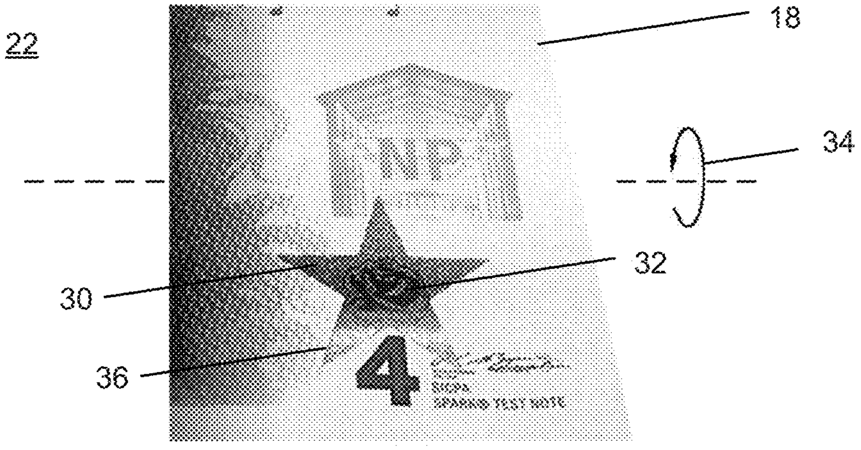
FIG. 7A is a schematic illustrating a "rolling bar" optical effect on an article.
Figure 7B:
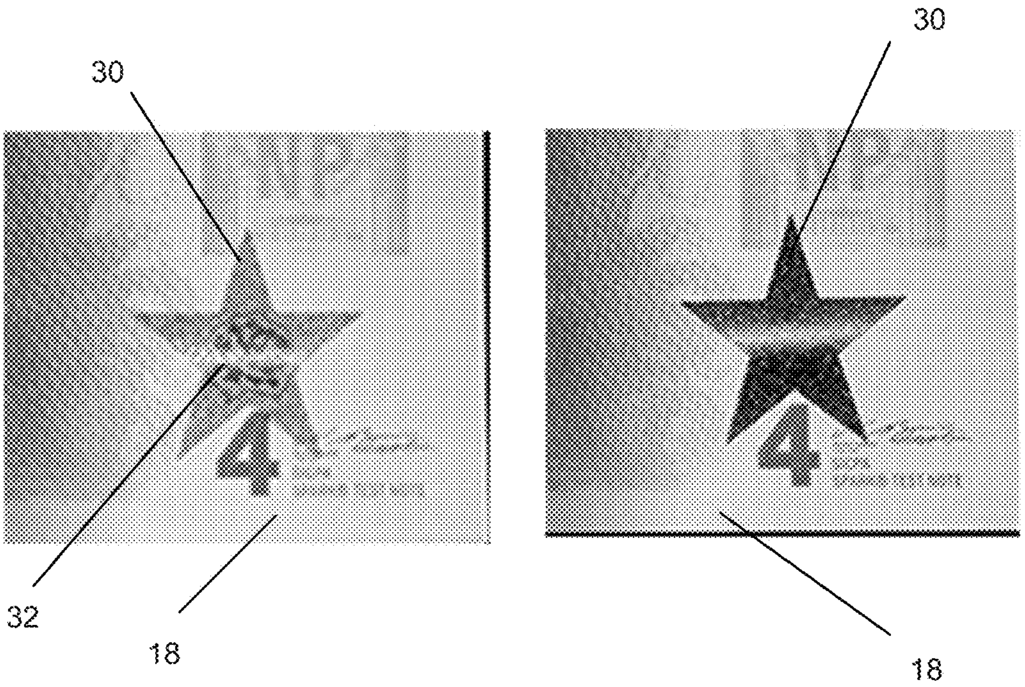
FIG. 7B is a schematic illustrating a "rolling bar" optical effect on an article according to an aspect of the invention (left) and an article using a conventional opaque magnetic pigment (right)

The disclosed semi-transparent magnetic pigment 12 has more transparency than an ink including conventional color-shifting pigment. As shown in FIGS. 7A and 7B, an image 30, such as a star, was printed on a substrate 18 with a composition 14, such as an ink, including 25 wt. % of the semi-transparent magnetic pigment 12 of Example 3. The image was printed on the top of a second image 32, such as the rose, which was pre-printed on the substrate 18. The article 22 in FIG. 6 with the wet composition 14 was placed in a magnetic field 16 produced from a permanent magnet. The semi-transparent magnetic pigment 12 was aligned to produce the "rolling bar" optical effect. The composition 14 was cured with UV light so that the semi-transparent magnetic pigment 12 was fixed in the liquid medium of the composition 14 at different angles to a surface of the substrate 18 defined by the angles of the field. The substrate 18 was tilted with its upper edge away from a camera in the direction 34. At this condition, a bright band 36 of the "rolling bar" optical effect moved to the lower side of the image 30. The second image 32 was still highly visible. An article 22 made with a conventional magnetizable color-shifting pigment makes the second image completely opaque. FIG. 7B illustrates two images. The left image illustrates a article made with the semi-transparent magnetic pigment 12 at the normal observation angle, in which the second image is highly visible. The right image illustrates an article made with a conventional magnetizable pigment.

Figure 8:
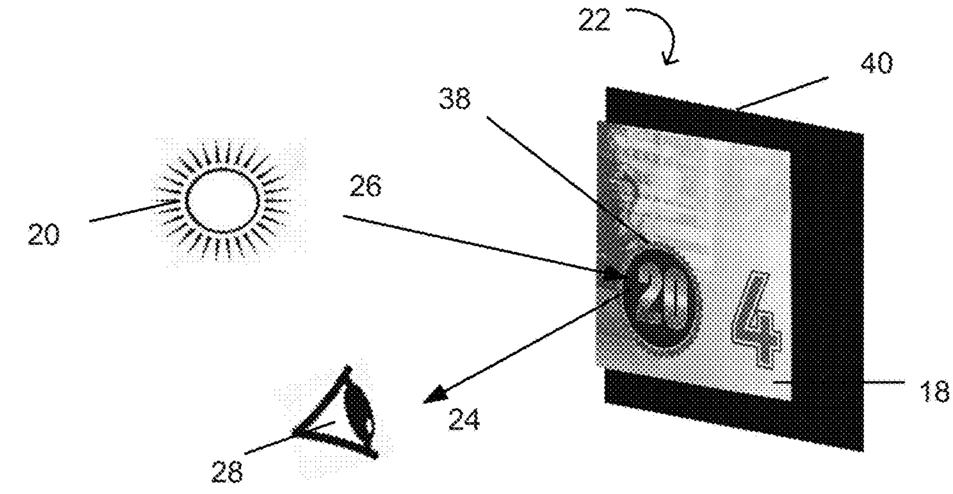
FIG. 8 is a schematic illustrating reflected light from an article and a "rolling bar" optical effect with a dark background to show contrast, according an aspect of the invention.
Figure 9:
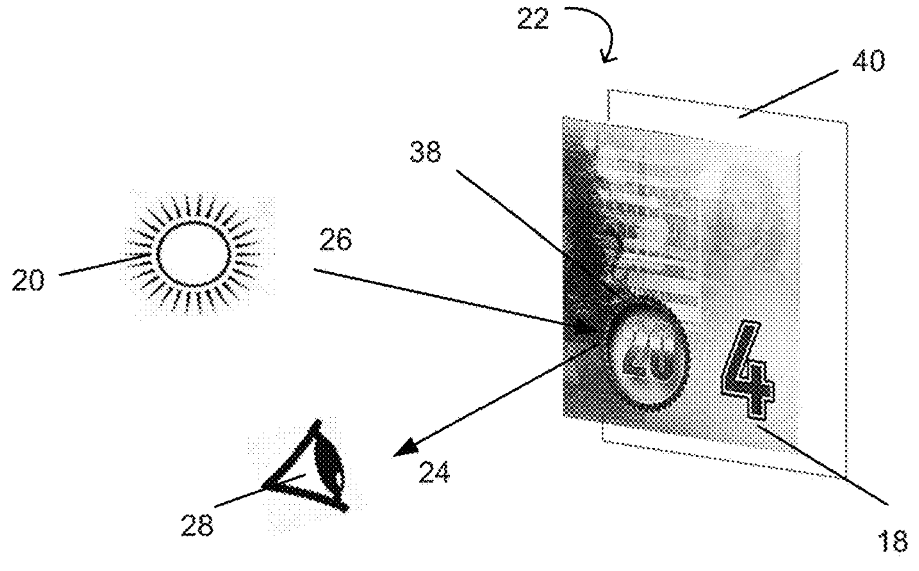
FIG. 9 is a schematic illustrating reflected light from an article and a "rolling bar" optical effect with a light background to show contrast, according to an aspect of the invention.
Figure 10:
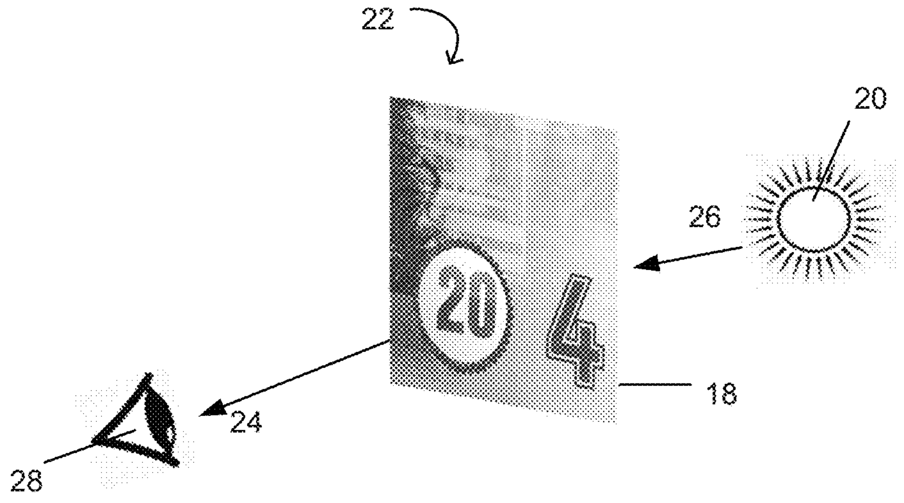
FIG. 10 is a schematic illustrating transmitted light from an article and a "rolling bar" optical effect, according to an aspect of the invention.

Example 4—FIGS. 8-10 demonstrate a "rolling bar" optical effect produced by the composition 14 containing the semi-transparent magnetic pigment 12 described in Example 3. The composition 14 in the shaped of the numeral 20 was printed in a transparent window 38 of a substrate 18, such as a polymer substrate. A light source 20 and an observer 28 are in front of the article 22 in FIG. 8. The light ray 26 comes to the article 22 and reflects along direction 24 to the observer 28. The numeral "20" looks bronze with a bright gold band in the center at a normal observation angle. A black card 40 was placed behind the article 22 to illustrate the high contrast of the bright gold band, FIG. 8 illustrates that, at a first angle, the semi-transparent magnetic pigment 12 can reflect a first color, such as bright gold.

The contrast in the article 22 became less pronounced when a white card 40 was placed behind the article 22, as shown in FIG. 9. The "rolling bar" is still highly visible as a bright gold band.

The appearance of the article 22 changes when a light source 20 is located behind the article 22, as shown in FIG. 10. In particular, the light comes toward the observer 28 through rays 26 and 24 through a transparent window 38 of the substrate 18, The composition 14 including the semi-transparent magnetic pigment 12 is printed on the transparent window 38. The liquid medium of the composition 14 is clear and transparent in addition to the transparent window 38 of the substrate 18, The "rolling bar" is blue in transmission, as shown in FIG. 10, and that makes the image "20"

blue at observation through the transparent window 38, The difference in the appearance of the reflected (FIGS. 8 and 9) and the transmitted (FIG. 910) lights is unique to the semi-transparent magnetic pigment 12, a composition 14 including the semi-transparent magnetic pigment 12, and an article 22 with the composition 14. FIG. 10 illustrates that, at a first angle, the semi-transparent magnetic pigment 12 can transmit a second color (blue), which is different from the reflected first color (bright gold in FIG. 8).

Figure 11:
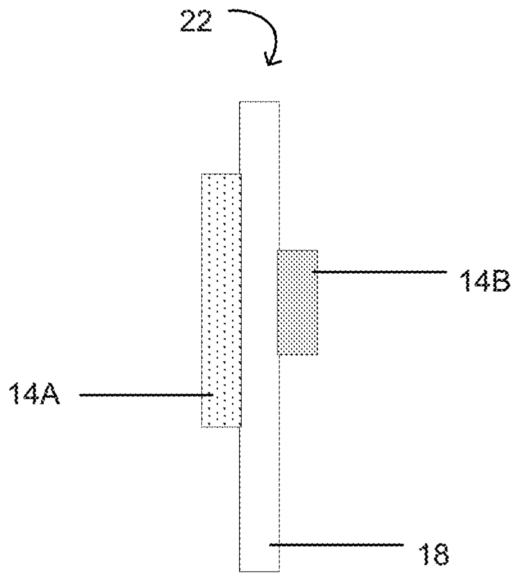
FIG. 11 is a cross-section of an article including a first composition on a first side of a substrate and a second composition on a second side of the substrate.
Figure 12:
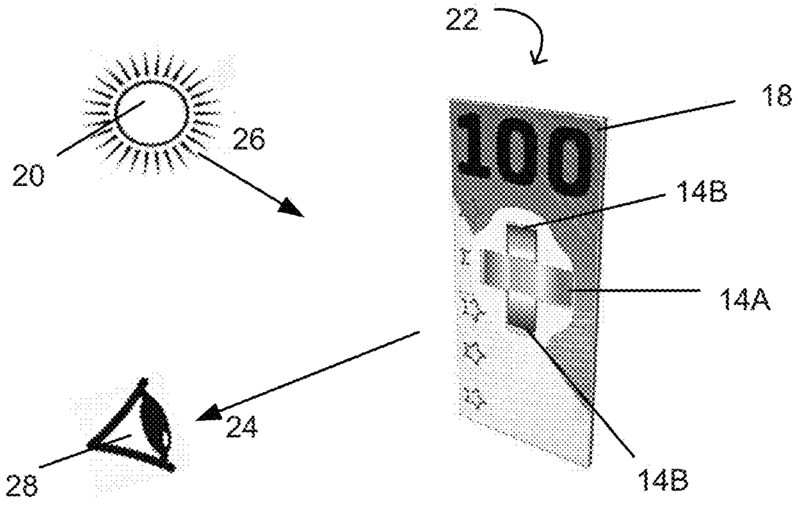
FIG. 12 is a schematic illustrating reflected light from the article in FIG. 11, according to an aspect of the invention.
Figure 13:
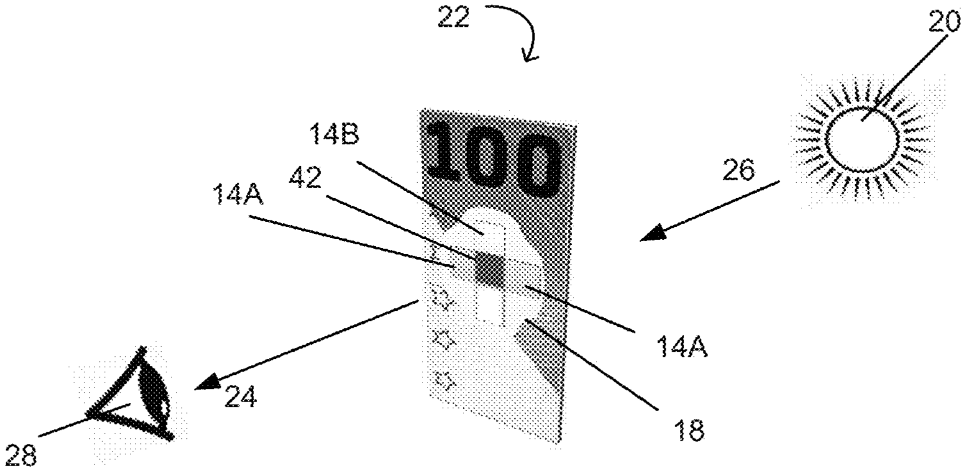
FIG. 13 is a schematic illustrating transmitted light from the article in FIG. 11, according to another aspect of the invention.

Example 5—FIGS. 11-13 illustrates an article 22 with a first composition 14A on a first side of a substrate 18 and a second composition 14B on a second side of the substrate 18. Both have the same rectangular shape, 14B is parallel to the length of the substrate, 14A is perpendicular to the length of the substrate. The substrate 18 is a polymer banknote with a transparent window 38 similar to the one illustrated in FIGS. 8-10. The first composition 14A included a first semi-transparent magnetic pigment 12A that exhibits an orange color (first color) in reflection and a blue color (second color) in transmission. The second composition 14B included a second semi-transparent magnetic pigment 12B that exhibits a blue color (third color) in reflection and a yellow color (fourth color) in transmission. The first and second compositions 14A, 14B were subjected to a magnetic field 16 to align the respective semi-transparent magnetic pigments 12A, 12B to produce a "rolling bar" effect. The rolling bar effect moves in the length direction of each rectangular printed shape. The "rolling bar" effect is exemplary and any other optical effect can be used.

As shown in FIG. 12, the article 22 reflects incident light ray 24 towards the observer 28. The article 22 exhibits a horizontal orange/gold rectangular region from the first composition 14A and two blue squares from the second composition 14B because the gold region overlaps the blue region in the middle square and obscures the middle portion of the region 14B. The "rolling bar" effect can be seen in the gold region from the first composition 14A at the tilt of the article 22 from side to side. The "rolling bar" effect can be seen in the blue region from the second composition 14B at the tilt of the article 22 from front to back. The planes of the magnetically aligned semi-transparent magnetic pigment 12 coincide with the observation direction so that the semi-transparent magnetic pigment 12 does not obscure the view. The rolling bar on the back second composition 14B shows through the first composition 14A on the front side of the substrate.

The appearance of the article 22 is completely different when the light source 20 is placed behind the substrate 18, as shown in FIG. 13. The light ray 26 illuminates the backside of the substrate 18 and goes through the transparent window 38 and the first and second compositions 14A, 14B containing the semi-transparent semi-transparent magnetic pigments 12, The first composition 14A exhibits a cyan color in transmission and second composition 14B exhibits a yellow color in transmission. The region of overlap 42 of the first and second compositions 14A, 14B exhibits a green color as a result of blending of the transmitted cyan (14A) and yellow (14B) light.

Example 6—The article 22 can include a substrate 18 and a composition 14 on the substrate 18, The composition 14C can include a liquid medium and a semi-transparent magnetic pigment 12 and can also include a magnetizable color shifting opaque pigment 44. In another aspect, the article 22 can include a substrate 18 and a first composition 14 on the substrate 18; and a third composition 46 including a liquid medium and a magnetizable color shifting opaque pigment 44 on at least one of the substrate 18 and the first composition 14. The article 22 can produce a color matching optical effect at a specific viewing and illumination angle. The semi-transparent magnetic pigment 12 and the magnetizable color shifting opaque pigment 44 can color shift from a first color to a second color; such as from gold to green, at a tilt of the article 22 away from the observer 28. However, the second color of the semi-transparent magnetic pigment 12 can have lower chromaticity than the second color of the magnetizable color shifting opaque pigment 44. The difference in chromaticity can be a result of lower reflectance and higher transmittance of the semi-transparent magnetic pigment 12 in comparison with the magnetizable color shifting opaque pigment 44, In particular, the semi-transparent magnetic pigment 12 can have a lower reflectance because the semi-transparent, metallic, magnetic material 1, working as a reflector, is semi-transparent. The semi-transparent, metallic, magnetic material 1 reflects less light than an opaque reflector, such as aluminum. For this reason, a conventional magnetic pigment would exhibit higher reflectance than the semi-transparent magnetic pigment 12. On the other hand, the semi-transparent. Metallic, magnetic material 1 in the semi-transparent magnetic pigment 12 provides higher transmittance of light. The semi-transparent, metallic, magnetic material 1 does not shutter the light when it goes through the semi-transparent magnetic pigment 12, which is the case for a conventional opaque pigment. This difference can be reduced by using a lower pigment coverage, lower loading and/or thinner ink layer, for the conventional opaque pigment than for the semi-transparent magnetic pigment 12.

Figure 14:
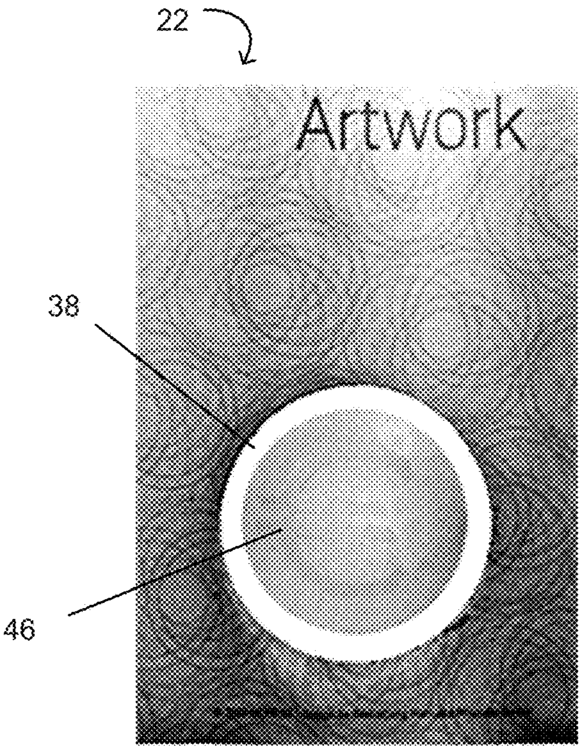
FIG. 14 is a schematic illustrating an article including a first composition and a third composition.

As shown in FIG. 14, the article 22 includes a substrate 18 having a transparent window 38. A first composition 14A including a liquid medium and a semi-transparent magnetic pigment 12 is printed on the transparent window 38 in a form of a circle, and aligned in a magnetic field 16 of a spinning magnet to produce a convex spherical optical effect. The circle formed of the first composition 14A exhibited a gold-to-green color shift at the tilt of the article 22 in the reflected light and a blue-to-red color shift in the transmitted light. Additionally, the article 22 included a third composition 46 including a liquid medium and a magnetizable color shifting opaque pigment 44, in which the third composition 46 is printed, in a form of a Euro symbol, on, and/or surrounded by, the first composition 14A. The third composition 46 also exhibited a gold-to-green color shift. However, the chromaticity of the third composition 46 was higher than the chromaticity of the first composition 14A because the magnetizable color shifting opaque pigment 44 in the third composition 46 is opaque whereas semi-transparent magnetic pigment 12 in the first composition 14A is semi-transparent. At a normal observation angle, as shown in FIG. 14, the Euro symbol is barely visible because both the semi-transparent magnetic pigment 12 and the magnetizable color shifting opaque pigment 44 reflect the same gold color.

Figure 15:
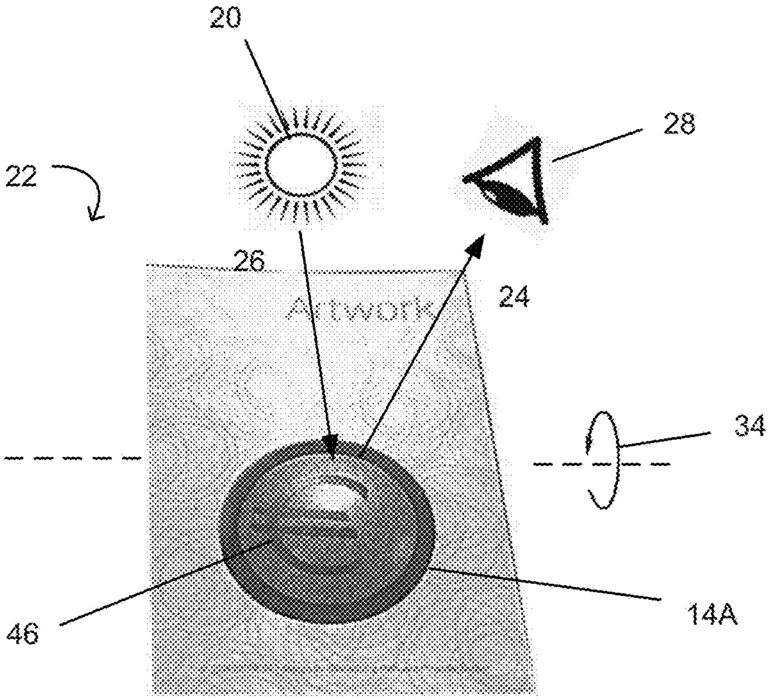
FIG. 15 is a schematic illustrating reflected light from the article in FIG. 14.

As shown in FIG. 15, the appearance of the article 22 change when it was tilted with its upper edge away from the observer 28. The circle, printed with the first composition 14A, changed its color to pale green, while the Euro symbol, printed with the third composition 46, changed to bright green making the Euro symbol highly visible on the pale background formed by the ink with the semi-transparent magnetic pigment 12.

Figure 16:
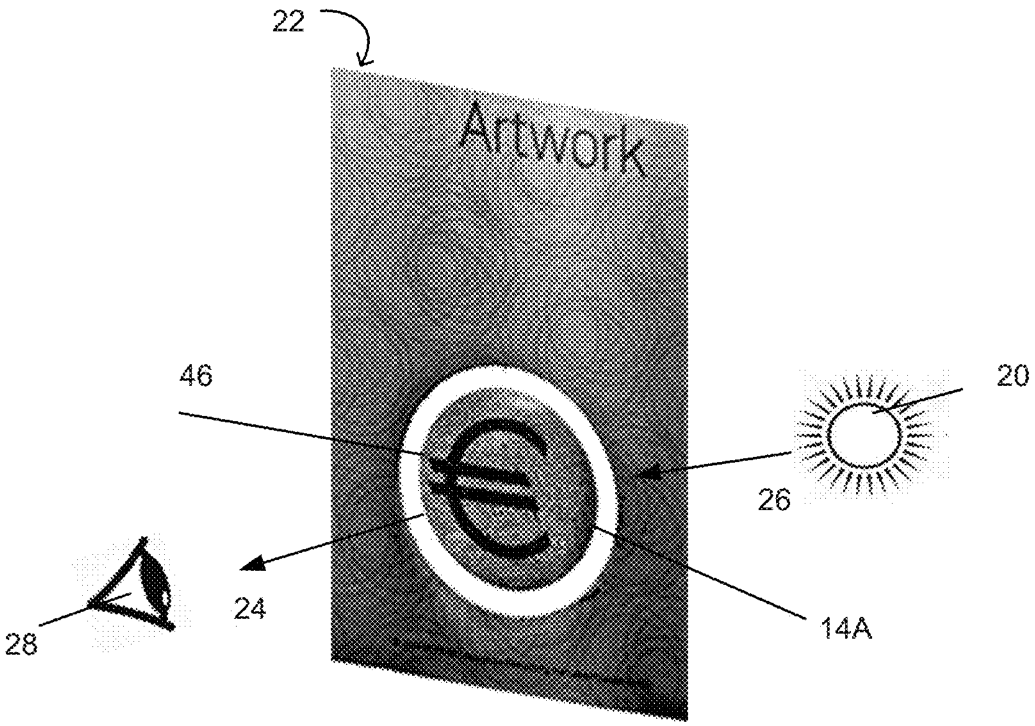
FIG. 16 is schematic illustrating transmitted light from the article in FIG. 14.

As shown in FIG. 16, the colors (first, second, third, fourth, etc.) of the article 22 changed when the light source 20 was behind the article 22. The light source 20 illuminated the article 22 from behind. The light ray 26 came to the observer 28 through the first composition 14*a*, which is in the form of a circle and is a blue color (first color in transmission). The light ray 26 was blocked by the third composition 46, including the magnetizable color shifting opaque pigment 44, which is the Euro symbol. The observer 28 perceives the Euro symbol as a black contour on a blue circle background. The blue circle background, i.e., the first composition 14A, gradually changes its color to red (second color in transmission) when the observation angle changes by tilting the article 22.

There is also disclosed a method of making an article, including providing a substrate 18; and depositing a first composition 14A on a first surface of a substrate 18, wherein the first composition 14A includes a liquid medium and a semi-transparent magnetic pigment 12. The method can also include depositing a second composition 14B on a second surface of the substrate 18 opposite the first surface. The method can also include depositing a third composition on the first composition, wherein the third composition includes a liquid medium and magnetizable color-shifting opaque pigment. The first composition exhibits a first color in reflection and a second color in transmission. The first composition 14A, semi-transparent magnetic pigment 12, and second composition 14B are as described above with regard to the article 22.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article comprising:

a substrate with a transparent window; and a first composition on the transparent window, the first composition including a cured liquid medium, and a semi-transparent magnetic pigment, wherein the semi-transparent magnetic pigment includes a semi-transparent, metallic magnetic material and a light interference cavity that includes a dielectric material, wherein the dielectric material of the semi-transparent magnetic pigment is present in multiple layers, the semi-transparent, metallic magnetic material being located at a center of the semi-transparent magnetic pigment, wherein the semi-transparent, metallic magnetic material is a semi-transparent thin layer or a particle in a layer, and wherein and a first layer of the multiple layers of the dielectric material is directly adjacent to one side of the semi-transparent, metallic magnetic material and a second layer of the multiple layers of the dielectric material is directly adjacent to an opposite side of the semi-transparent, metallic magnetic material.

2. The article of claim 1, wherein the semi-transparent magnetic pigment is a magnetic dichroic pigment.

3. The article of claim 1, wherein the substrate is opaque.

4. The article of claim 1, wherein the substrate is a polymer or paper substrate.

5. The article of claim 1, wherein the first composition is on a first side of the transparent window; and further comprising a second composition on a second side of the transparent window opposite the first side, wherein the second composition is the same as the first composition.

6. The article of claim 1, wherein the first composition is on a first side of the transparent window; and further comprising a second composition on a second side of the transparent window opposite the first side, wherein the first composition includes a first semi-transparent magnetic pigment, the second composition includes a second semi-transparent magnetic pigment, and the first and the semi-transparent second magnetic pigments are different.

7. The article of claim 1, wherein the multiple layers of dielectric material are alternated with layers of a metallic material.

8. The article of claim 1, wherein the multiple layers of dielectric material are alternating layers of a high refractive index dielectric material and a low refractive index dielectric material.

9. The article of claim 1, wherein the semi-transparent magnetic pigment exhibits a first color in reflection and a second color in transmission.

10. The article of claim 6, wherein the first semi-transparent magnetic pigment exhibits a first color in reflection and a second color in transmission, and the second semi-transparent magnetic pigment exhibits a third color in reflection and a fourth color in transmission.

11. The article of claim 1, wherein the article also includes a third composition including a magnetizable color-shifting opaque pigment.

12. The article of claim 11, wherein the third composition is present on at least one of the substrate and the first composition.

13. The article of claim 12, wherein the third composition is on the first composition.

14. The article of claim 12, wherein the third composition is on the transparent window, and the first composition is on the third composition.

15. A method of making an article, comprising:

providing a substrate with a transparent window;

depositing a first composition on a first surface of the transparent window, wherein the first composition includes a liquid medium and a semi-transparent magnetic pigment, wherein the semi-transparent pigment includes a semi-transparent, metallic magnetic material and a light interference cavity that includes a dielectric material, the semi-transparent, metallic magnetic material being located at a center of the semi-transparent magnetic pigment, wherein the dielectric material of the semi-transparent magnetic pigment is present in multiple layers; and curing the liquid medium;

wherein the semi-transparent, metallic magnetic material is a semi-transparent thin layer or a particle in a layer, and wherein and a first layer of the multiple layers of the dielectric material is directly adjacent to one side of the semi-transparent, metallic magnetic material and a second layer of the multiple layers of the dielectric material is directly adjacent to an opposite side of the semi-transparent, metallic magnetic material.

16. The method of claim 15, further comprising depositing a second composition on a second surface of the transparent window opposite the first surface.

17. The method of claim 15, further comprising depositing a third composition on the first composition, wherein the third composition includes a liquid medium and magnetizable color-shifting opaque pigment.

18. The method of claim 15, wherein the first composition exhibits a first color in reflection and a second color in transmission.

19. The method of claim 15, further comprising aligning the semi-transparent magnetic pigment along magnetic field lines before hardening the liquid medium by the curing.

* * * * *